United States Patent

Yamashita et al.

[15] 3,636,492

[45] Jan. 18, 1972

[54] SINTERED SEMICONDUCTOR FILM AND METHOD OF MANUFACTURING SAME

[72] Inventors: Toshio Yamashita; Tadao Ohtani, both of Hirkata-shi; Manabu Yoshida, Moriguchi-shi; Saburo Kitamura, Kyoto; Hideaki Murakami, Ibaragi-shi, all of Japan

[73] Assignee: Matsushita Electric Industrial Co., Ltd., Osaka, Japan

[22] Filed: Aug. 5, 1968

[21] Appl. No.: 750,315

[52] U.S. Cl. ................................338/15, 117/34, 117/105.4, 117/201, 117/211, 118/320

[51] Int. Cl. ......................................B05b 13/02, H01c 7/08

[58] Field of Search ...........338/15; 117/34, 201, 211, 105.4, 117/23; 118/320, 322

[56] References Cited

UNITED STATES PATENTS

| | | | |
|---|---|---|---|
| 2,957,152 | 10/1960 | Van Gool et al. | 338/15 |
| 3,142,586 | 7/1964 | Colman | 338/15 X |
| 3,222,215 | 12/1965 | Durr | 117/201 |
| 3,238,062 | 3/1966 | Sunners et al. | 117/201 |
| 3,248,261 | 4/1966 | Narken et al. | 338/15 X |
| 3,284,235 | 11/1966 | Van Santen et al. | 117/201 |
| 3,443,103 | 5/1969 | Lakshmanan | 338/15 X |
| 3,447,234 | 6/1969 | Reynolds et al. | 338/15 X |
| 2,983,631 | 5/1961 | Hanlet | 117/23 X |
| 3,496,037 | 2/1970 | Jackson, Jr. et al. | 117/201 X |

*Primary Examiner*—Malcolm F. Hubler
*Attorney*—Stevens, Davis, Miller & Mosher

[57] ABSTRACT

A method of manufacturing a sintered film composed of cadmium sulfide, cadmium selenide, etc. which is free from cracks and pinholes, and a semiconductor element having sandwich-type electrode structure comprised of the sintered film.

5 Claims, 5 Drawing Figures

PATENTED JAN 18 1972

3,636,492

INVENTOR

BY

ATTORNEY

SINTERED SEMICONDUCTOR FILM AND METHOD OF MANUFACTURING SAME

Figure 1:
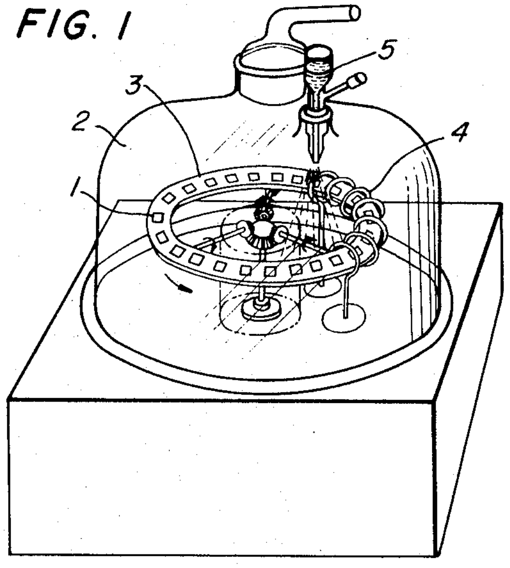

The present invention relates to a method of manufacturing a sintered film composed of cadmium sulfide, cadmium selenide, or solid solution of them and a semiconductor element employing the film.

There are many conventional methods of manufacturing a semiconductor element composed of a sintered film of cadmium sulfide, cadmium selenide, or solid solution of them. As an example thereof a method of manufacturing a photoconductive element will be described next. This method provides the photoconductive element by the steps of: applying by spraying a mixture in which a fine powder of cadmium sulfide, cadmium selenide, or mixture of them is dispersed in an aqueous solution including a fusing agent and an activator onto a substrate made, for example, of a ceramic material in particular, the steps comprise; drying the sprayed substrate at a temperature of about 100° C.; heating the sprayed substrate in an atmosphere in which the amount of air is limited at a temperature of about 600° C. for 5 to 30 minutes to dissolve the fine powder into the fusing agent and to recrystallize the dissolved material as the fusing agent evaporates to form a photoconductive thin film; and depositing comb shaped opposing electrodes on the thin film to form ohmic contact by vacuum evaporation method or printing method.

However, it seems almost impossible to improve the photosensitivity of the photoconductive element manufactured by the method described above, since the photosensitivity of the photoconductive layer itself has nearly reached its limit and it is difficult technically to reduce further the distance between the electrodes.

In order to reduce the distance between the electrodes and to utilize incident light effectively, a so-called sandwich type electrode structure has been proposed in which two electrodes are placed on the upper and lower surfaces of a photoconductive layer, one of the electrodes being made of a transparent conductive film or a grid-shaped metal electrode.

However, when the sintered film was manufactured by the conventional method, cracks and pinholes were produced in the film in the process of drying or sintering after the mixture was applied onto the substrate. Consequently, when a metal for electrodes was deposited onto the photoconductive layer by a vacuum evaporation method, for example, the two electrodes were short-circuited through these cracks and pinholes, which made it impossible to manufacture a photoconductive element having a sandwich type electrode structure.

Such a problem also occurs in the manufacture of thin film solar cells utilizing cadmium sulfide. In this case also, there must not be cracks nor pinholes in the cadmium sulfide thin film.

Therefore, mainly an evaporated film having no pinholes is used for the cadmium sulfide thin film solar cell, and a cell using a sintered film has not yet been realized. This is because it has become an established concept that pinholes are inevitably produced in the sintered film.

Therefore, it is an object of the present invention to provide a sintered semiconductor thin film free from cracks and pinholes. According to the present invention a highly efficient semiconductor element can easily be provided.

According to the method of the present invention, a uniform sintered film completely free from cracks and pinholes which were inevitable by the conventional method can be manufactured with good reproducibility by applying a mixture composed of cadmium sulfide etc., to a substrate maintained at a temperature of or higher than 100° C. to instantaneously evaporate water in the mixture when the mixture reaches the substrate, and by recrystallizing the cadmium sulfide.

Figure 2A:
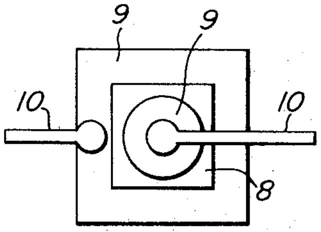
Figure 2B:
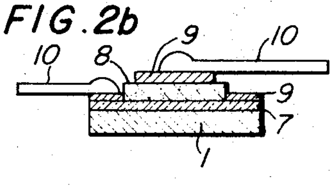
Figure 3:
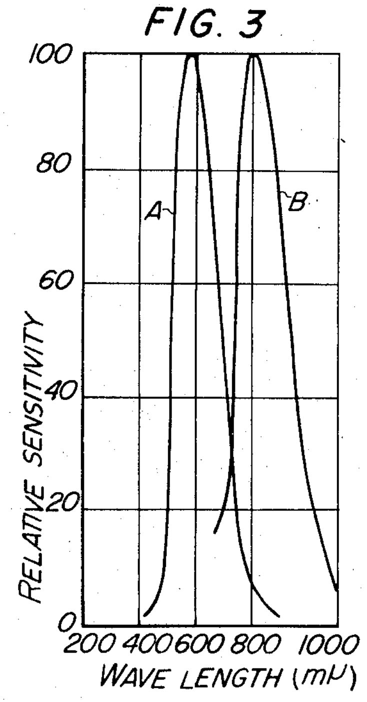
Figure 4:
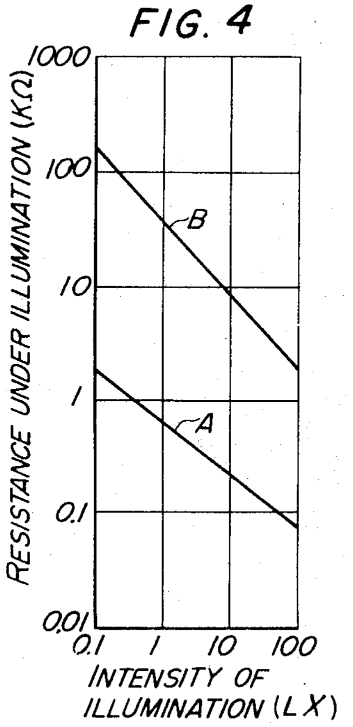

Other objects, features and advantages of the present invention will be readily apparent from the following detailed description of certain preferred embodiments taken in conjunction with the accompanying drawings, in which:

FIG. 1 is a perspective view of an example of the apparatus used for working the manufacturing method of the present invention;

FIGS. 2*a* and 2*b* are plan and cross-sectional views, respectively, of an example of the photoconductive element produced by the manufacturing method according to the present invention;

FIG. 3 is a diagram illustrating the spectral sensitivity of the photoconductive element of FIGS. 2*a* and 2*b*; and FIG. 4 is a diagram illustrating resistance under illumination vs. intensity of illumination characteristics of photoconductive elements provided by the method according to the present invention and the conventional one.

Now, the present invention will be described with reference to the accompanying drawings.

In the present invention, a mixture of cadmium sulfide, a fusing agent, etc. is applied to a substrate 1 which has been heated to a temperature of or higher than 100° C. by means of an apparatus as shown in FIG. 1 in order to instantaneously evaporate the water in the mixture when the mixture reaches the substrate. In case cadmium chloride is used as the fusing agent, the cadmium sulfide powder begins to dissolve into the cadmium chloride at a temperature of or higher than 540° C. Then, although it must be enough to apply the mixture to the substrate keeping the temperature of the substrate equal to or higher than 540° C., at such a high temperature as this a film of vapor is produced around the surface of the particle of the applied mixture in the moment of its arrival at the substrate, which prevents the evaporation of water and causes the jumping of the particle on the substrate. Thus, the particle hardly deposits on the substrate. Therefore, the temperature at the position where the application of the mixture is carried out is kept relatively low, while the thickness of a rotary ring 3 is made small and the velocity of its rotation is slowed down to about 1 r.p.m. so that the temperature of the coated substrate is raised to the sintering temperature when it passes an RF induction coil after the application of the mixture has been carried out. By the process described above, the application and sintering of the mixture is carried out during one rotation of the rotary ring 3, and by repeating the process a thick sintered layer completely free from pinholes and cracks can be provided. When the sintering is insufficient after a predetermined amount of mixture is applied and sintered, only the sintering process can be repeated.

When an inert gas is used for a high-pressure gas for a spray gun 5 for spraying the mixture, the spraying and sintering are carried out in an atmosphere of the inert gas.

Next, a specific example will be described in detail.

A clean 8×8×0.3 mm. borosilicate glass substrate 1 with a transparent conductive film thereon is mounted on the rotary ring 3 made of a metal or graphite in a belljar 2. The rotary ring 3 is partially heated to about 600° C. by the RF induction coil 4 while rotating at about 1 r.p.m., and then a mixture having the following composition is continuously sprayed onto the substrates 1 by the spray gun 5 vertically positioned at about 10 cm. above the portion of the rotary ring 3 in the vicinity of the entrance of the heating coil 4, after which the coatings are successively sintered by the heating coil 4.

MIXTURE COMPOSITION

| | |
|---|---|
| CdS: | 100 g. |
| $CdCl_2$: | 10 g. |
| 0.1 mol $CuCl_2$: | 1.7 cc. |
| $H_2O$: | 500 cc. |

By the process described above, a photoconductive film with a thickness of about 10 $\mu$ is provided during four rotations of the rotary ring 3, and after stopping the spraying the sintering is carried out with two more rotations.

The photoconductive film 8 thus sintered is cut to a size of 4×4 mm. by a waferscriber, and then indium electrodes 9 are deposited by vacuum evaporation on the partially exposed transparent electrode 7 and the photoconductive layer 8 as shown in FIG. 2. Lead wires 10 are soldered by means of indium solder to these electrodes. In this case the area of the indium electrodes 9 on the photoconductive layer 8 was about 4 $mm^2$.

The spectral sensitivity characteristic of a photoconductive element provided by the method described above is shown in FIG. 3 by line A. This spectral sensitivity characteristic is that of an element employing cadmium sulfide as the photoconductor. The peak of this spectral sensitivity can be shifted to a certain extent toward the longer wavelength side by incorporating cadmium selenide into the photoconductive film. Especially, when the thickness of the film is made relatively thick using only cadmium selenide as the photoconductor, a photoconductive element can be provided which has a high sensitivity in the near infrared region due to the self filtering effect of the photoconductive layer. This characteristic is shown in FIG. 3 at line B.

The resistance under illumination vs. intensity of illumination characteristic of the photoconductive element according to the present invention is shown in FIG. 4 at line A. It can be seen from the figure that the resistance under illumination is less than one-tenth times that of the paired electrode type photoconductive element (light-sensitive area: 20 $mm.^2$) provided by the conventional method as indicated by the characteristic line B. Therefore, it can be said that the sensitivity per unit light sensitive area is 50 times higher.

As has been described above, cracks and pinholes in the photoconductive layer which were inevitable by the conventional method can be completely eliminated according to the method of the present invention, and hence it is possible to manufacture a highly sensitive photoconductive element having sandwich-type electrode structure with small photosensitive area.

Moreover, according to the method of the present invention, since the application and sintering of the mixture can be carried out with a single process, the process of manufacture is simple and a number of elements having identical characteristic, equal thickness of film and uniformity can be provided at one time. Furthermore, since a large electric current per unit light-sensitive area under illumination can be obtained with the element provided by the method of the present invention, a number of miniature elements can easily be integrated and the fabrication of a card reader and a light receiving device for pattern recognition are possible. Other features of the present invention are that the method is suitable for mass production since batch-type manufacturing method is possible and the photoconductive element having a high sensitivity in the near infrared region can be provided by the use of cadmium selenide as photoconductive layer.

Some features of the sandwich-type photoconductive element manufactured by the method of the present invention have been described above. However, the sintered film composed of, for example, cadmium sulfide which is completely free from cracks and pinholes has many applications in addition to photoconductive elements. For example, the sintered film can be utilized for a photovoltaic element, piezoresistance element, electrophotographic apparatus, thin film transistor, etc.

What is claimed is:

1. An apparatus for manufacturing sintered semiconductor films from a mixture comprising
   a. movable support means comprising a rotary ring capable of carrying thereon a plurality of substrates and being driven by a drive mechanism;
   b. heating means comprising an electrical heating coil surrounding a portion of said movable support means, said heating means heating the substrates mounted on the portion of said support means adjacent said heating means to a required temperature;
   c. shielding means enclosing said support and heating means and shielding them from ambient atmosphere; and
   d. spraying means located on the shielding means above a portion of said support means near said heating means for spraying said mixture on said substrates.

2. Apparatus according to claim 1 wherein said rotary ring is made from a material selected from the group consisting of a metal and graphite.

3. Apparatus according to claim 1 in which the heating coil comprises an RF induction heating coil.

4. Apparatus according to claim 1 wherein said spraying means comprises a spray gun mounted above said rotary ring adjacent one end of said electrical heating coil.

5. A method of continuously manufacturing sintered photoconductive semiconductor films free from pinholes comprising the steps of
   a. preparing a mixture including a halide fusing agent and at least one material selected from the group consisting of cadmium sulphide and cadmium selenide;
   b. rotating in a predetermined circle a plurality of substrates successively at a relatively low speed, each substrate being formed of glass having a transparent electroconductive layer;
   c. preheating each of said substrates being rotated at a temperature of about at least 100° C.;
   d. spraying said mixture onto the substrates maintained at said temperature to apply the mixture thereon while instantaneously evaporating water in the applied mixture;
   e. subsequently heating the substrates being continuously moved on said circle to a sintering temperature of the mixture substantially immediately after said spraying process for a period of time determined by said rotating speed of the substrates; and
   f. repeating the substrate rotation and preheating and the mixture application and the heating to sintering temperature at least twice.

* * * * *